(12) United States Patent
Yu

(10) Patent No.: US 12,026,600 B2
(45) Date of Patent: Jul. 2, 2024

(54) SYSTEMS AND METHODS FOR TARGET REGION EVALUATION AND FEATURE POINT EVALUATION

(71) Applicant: ZHEJIANG DAHUA TECHNOLOGY CO., LTD., Zhejiang (CN)

(72) Inventor: Xufeng Yu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 470 days.

(21) Appl. No.: 17/304,755

(22) Filed: Jun. 25, 2021

(65) Prior Publication Data
US 2021/0319254 A1 Oct. 14, 2021

Related U.S. Application Data

(63) Continuation of application No. PCT/CN2018/124372, filed on Dec. 27, 2018.

(51) Int. Cl.
*G06N 20/20* (2019.01)
*G06F 18/20* (2023.01)
(Continued)

(52) U.S. Cl.
CPC ........... *G06N 20/20* (2019.01); *G06F 18/214* (2023.01); *G06F 18/217* (2023.01); *G06F 18/29* (2023.01);
(Continued)

(58) Field of Classification Search
CPC ........ G06N 20/20; G06N 20/10; G06N 3/045; G06N 5/01; G06F 18/214; G06F 18/217;
(Continued)

(56) References Cited

U.S. PATENT DOCUMENTS

| 2008/0166026 A1* | 7/2008 | Huang | G06V 40/171 |
| | | | 382/118 |
| 2015/0110349 A1* | 4/2015 | Feng | G06V 40/162 |
| | | | 382/103 |

(Continued)

FOREIGN PATENT DOCUMENTS

| CN | 103530599 A | 1/2014 |
| CN | 104077594 A | 10/2014 |

(Continued)

OTHER PUBLICATIONS

International Search Report in PCT/CN2018/124372 mailed on Sep. 26, 2019, 4 pages.

(Continued)

*Primary Examiner* — Edward F Urban
*Assistant Examiner* — Wassim Mahrouka
(74) *Attorney, Agent, or Firm* — METIS IP LLC

(57) ABSTRACT

Systems and methods for target region evaluation and feature point evaluation are provided. The methods may include obtaining an image including a target region and extracting a plurality of feature points associated with the target region. The methods may further include, for each of the plurality of feature points, determining a sub-region including the feature point. The methods may further include performing a first grouping operation on the plurality of feature points to generate a plurality of first groups of sub-regions according to a first rule, and determining, based on the plurality of first groups of sub-regions, a confidence level associated with the target region using a plurality of trained models for processing the plurality of first groups of sub-regions, respectively. Each of the plurality of trained models may be associated with a set of model parameters. At least two sets of model parameters may be different.

18 Claims, 11 Drawing Sheets

(51) Int. Cl.
  *G06F 18/21* (2023.01)
  *G06F 18/214* (2023.01)
  *G06V 10/25* (2022.01)
  *G06V 10/44* (2022.01)
  *G06V 10/774* (2022.01)
  *G06V 10/82* (2022.01)
  *G06V 40/16* (2022.01)

(52) U.S. Cl.
  CPC .............. *G06V 10/25* (2022.01); *G06V 10/44* (2022.01); *G06V 10/7747* (2022.01); *G06V 10/82* (2022.01); *G06V 40/165* (2022.01)

(58) Field of Classification Search
  CPC ........ G06F 18/29; G06V 10/25; G06V 10/44; G06V 10/7747; G06V 10/82165
  See application file for complete search history.

(56) References Cited

U.S. PATENT DOCUMENTS

2018/0121716 A1* 5/2018 Sun ...................... G06V 40/165
2018/0157899 A1  6/2018 Xu et al.
2018/0182072 A1* 6/2018 Mora ...................... G06T 7/136
2018/0268203 A1  9/2018 Sohn et al.
2019/0373186 A1* 12/2019 Ortiz Egea .......... G06V 10/147

FOREIGN PATENT DOCUMENTS

| | | |
|---|---|---|
| CN | 107808147 A | 3/2018 |
| CN | 108121952 A | 6/2018 |
| CN | 108133238 A | 6/2018 |
| CN | 108268838 A | 7/2018 |
| CN | 108664839 A | 10/2018 |
| CN | 107944367 B | 6/2021 |

OTHER PUBLICATIONS

Written Opinion in PCT/CN2018/124372 mailed on Sep. 26, 2019, 4 pages.

* cited by examiner

FIG. 7

SYSTEMS AND METHODS FOR TARGET REGION EVALUATION AND FEATURE POINT EVALUATION

CROSS-REFERENCE TO RELATED APPLICATIONS

This application is a continuation of International Patent Application No. PCT/CN2018/124372, filed on Dec. 27, 2018, the contents of each of which are hereby incorporated by reference.

TECHNICAL FIELD

The present disclosure generally relates to face recognition, and in particular, to methods and systems for evaluating an accuracy associated with a target region in an image and/or an accuracy associated with the extraction of feature points associated with the target region.

BACKGROUND

Face detection is a computer vision technology for identifying the geometric structure of human faces in digital images. Face detection plays an important role in various fields, such as video surveillance, e-payment, unlocking a smart phone, etc. Face detection is also an important process in face recognition. The accuracy of the result of face detection may significantly affect the accuracy of the result of face recognition. Specifically, face detection often refers to a process for determining whether a face is present in the image and determining a position and/or other parameters associated with the face in the image. For example, a target region including a face may be determined in the face detection process. In some cases, the determination of the target region may be inaccurate due to factors such as pose changes, occlusions, exaggerated expressions, illumination variations, or the like, or any combination thereof. Therefore, it is desirable to provide more efficient systems and methods for evaluating the accuracy associated with the target region including the face.

SUMMARY

According to an aspect of the present disclosure, a system is provided. The system may include at least one storage medium including a set of instructions and at least one processor in communication with the at least one storage medium, wherein when executing the set of instructions, the at least one processor may be directed to cause the system to obtain an image including a target region and extract a plurality of feature points associated with the target region. For each of the plurality of feature points, the at least one processor may be directed to cause the system to determine a sub-region including the feature point. The at least one processor may be further directed to cause the system to perform a first grouping operation on the plurality of feature points to generate a plurality of first groups of sub-regions according to a first rule, and determine, based on the plurality of first groups of sub-regions, a confidence level associated with the target region using a plurality of trained models for processing the plurality of first groups of sub-regions, respectively. Each of the plurality of trained models may be associated with a set of model parameters, and at least two sets of model parameters may be different.

In some embodiments, to determine, based on the plurality of first groups of sub-regions, the confidence level associated with the target region using the trained target model, the at least one processor may be directed to cause the system to, for each group of the plurality of first groups of sub-regions, determine an accuracy parameter that indicates whether the extraction of the feature points in the first group of sub-regions may be accurate. The at least one processor may be further directed to cause the system to determine the confidence level based on the accuracy parameters of the plurality of first groups of sub-regions.

In some embodiments, the confidence level may be used to evaluate at least one of a first accuracy related to the target region or a second accuracy related to the extraction of the feature points associated with the target region.

In some embodiments, to evaluate the first accuracy related to the target region, the at least one processor may be directed to cause the system to compare the confidence level with a first threshold. The at least one processor may be further directed to cause the system to, in response to a determination that the confidence level may be greater than the first threshold, determine that the target region includes a target object.

In some embodiments, to evaluate the second accuracy related to the extraction of the feature points associated with the target region, the at least one processor may be further directed to cause the system to compare the confidence level with a second threshold. The at least one processor may be further directed to cause the system to, in response to a determination that the confidence level may be greater than the second threshold, determine that the extraction of the feature points is accurate.

In some embodiments, to perform the first grouping operation on the plurality of feature points to generate the plurality of first groups of sub-regions according to the first rule, the at least one processor may be directed to cause the system to preprocess the plurality of sub-regions to generate a plurality of preprocessed sub-regions, and generate, based on the plurality of preprocessed sub-regions, the plurality of first groups of sub-regions according to the first rule.

In some embodiments, to preprocess the plurality of sub-regions to generate the plurality of preprocessed sub-regions, the at least one processor may be directed to cause the system to perform a denoising operation on the plurality of sub-regions.

In some embodiments, to perform the denoising operation on the plurality of sub-regions, the at least one processor may be directed to cause the system to perform a second grouping operation on the plurality of feature points to generate a plurality of second groups of sub-regions according to a second rule. The at least one processor may be further directed to cause the system to, for each group of the plurality of second groups of sub-regions, perform the denoising operation on the second group of sub-regions to generate a third group of denoised sub-regions and redistribute the plurality of third groups of denoised sub-regions to generate the plurality of preprocessed sub-regions.

In some embodiments, the denoising operation may include at least one of a convolution operation or a filtering operation.

In some embodiments, the second rule may be different from the first rule.

In some embodiments, the plurality of trained models may be integrated in a trained target model, and the trained target model may be configured to process at least a portion of the plurality of first groups of sub-regions simultaneously.

In some embodiments, the trained target model may be obtained by performing a training process on a target model. The training process may include obtaining the target model and obtaining a plurality of training samples. Each of the plurality of training samples may include a plurality of training datasets, wherein each of the plurality of training datasets may include a group of reference sub-regions associated with a reference target region and a label including a reference accuracy parameter that indicates whether reference feature points in the group of reference sub-regions are accurate. The training process may further include training the target model using the plurality of training samples.

In some embodiments, at least one of the plurality of trained models may be constructed based on at least one of a convolutional neural network (CNN), a support vector machine (SVM) model, a linear regression model, a logistic regression model, a random forest model, a gradient boost model, or a decision-making tree.

A method implemented on a computing device including at least one processor and at least one storage medium. The method may include obtaining an image including a target region and extracting a plurality of feature points associated with the target region. The method may further include, for each of the plurality of feature points, determining a sub-region including the feature point. The methods may further include performing a first grouping operation on the plurality of feature points to generate a plurality of first groups of sub-regions according to a first rule, and determining, based on the plurality of first groups of sub-regions, a confidence level associated with the target region using a plurality of trained models for processing the plurality of first groups of sub-regions, respectively. Each of the plurality of trained models may be associated with a set of model parameters. At least two sets of model parameters may be different.

According to yet another aspect of the present disclosure, a system is provided. The system may include an obtaining module, configured to obtain an image including a target region. The system may further include a feature point extraction module, configured to extract a plurality of feature points associated with the target region. The system may further include a sub-region determination module, configured to, for each of the plurality of feature points, determine a sub-region including the feature point. The system may further include a grouping module, configured to perform a first grouping operation on the plurality of feature points to generate a plurality of first groups of sub-regions according to a first rule. The system may further include a confidence level determination module, configured to determine, based on the plurality of first groups of sub-regions, a confidence level associated with the target region using a plurality of trained models for processing the plurality of first groups of sub-regions, respectively. Each of the plurality of trained models may be associated with a set of model parameters, and at least two sets of model parameters may be different.

According to a further aspect of the present disclosure, a non-transitory computer readable medium is provided. The non-transitory computer readable medium may include executable instructions. When executed by at least one processor, the executable instructions may direct the at least one processor to perform a method for image processing. The method may include obtaining an image including a target region and extracting a plurality of feature points associated with the target region. The method may further include, for each of the plurality of feature points, determining a sub-region including the feature point and performing a first grouping operation on the plurality of feature points to generate a plurality of first groups of sub-regions according to a first rule. The method may further include determining, based on the plurality of first groups of sub-regions, a confidence level associated with the target region using a plurality of trained models for processing the plurality of first groups of sub-regions, respectively. Each of the plurality of trained models may be associated with a set of model parameters, and at least two sets of model parameters may be different.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of embodiments for illustration purposes. These embodiments are described in detail with reference to the drawings. These embodiments are non-limiting embodiments, in which like reference numerals represent similar structures throughout the several views of the drawings, and wherein:

FIG. 7 is a schematic diagram illustrating feature points associated with a target region according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
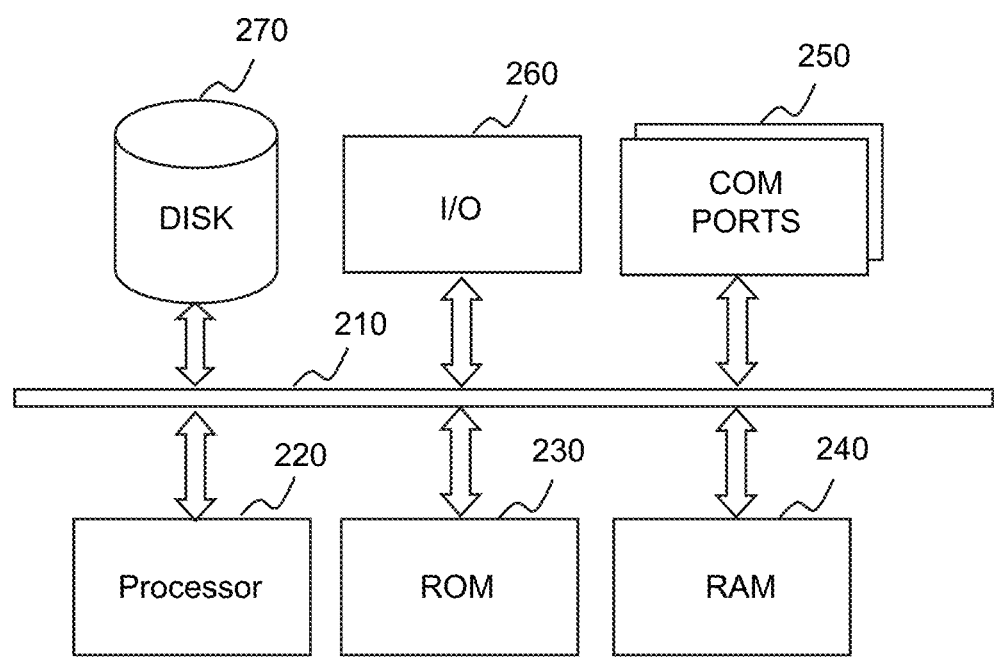
FIG. 2 is a schematic diagram illustrating hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

An aspect of the present disclosure relates to systems and/or methods for face recognition. An image including one or more objects (e.g., a human) may be obtained. A plurality of feature points associated with a target region (e.g., a face) in the image may be extracted. For each of the plurality of feature points, a sub-region including the feature point may be determined. For example, the feature point may be located in the center of the sub-region. A first grouping operation may be performed on the plurality of feature points to generate a plurality of first groups of sub-regions according to a first rule. For instance, the plurality of feature points may be divided into a plurality of first groups of feature points based on an order of identification numbers of the plurality of feature points. The plurality of first groups of sub-regions may be determined based on the plurality of first groups of feature points and a mapping relationship between each of the plurality of feature points and a corresponding sub-region. A confidence level associated with the target region may be determined based on the plurality of first groups of sub-regions using a plurality of trained models. In some embodiments, the plurality of trained models may be integrated in a trained target model. The trained target model is configured to process at least a portion of the plurality of first groups of sub-regions simultaneously. Thus, the efficiency for determining the confidence level may be improved. The confidence level may be used to evaluate a first accuracy related to the target region and/or a second accuracy related to the extraction of the feature points associated with the target region. For instance, in response to a determination that the confidence level is greater than a first threshold, the target region may be determined to include a target object (e.g., a face). As another example, in response to a determination that the confidence level is greater than a second threshold, the extraction of the feature points in the target region may be determined to be accurate. In some embodiments, the second threshold may be higher than the first threshold.

Figure 1:
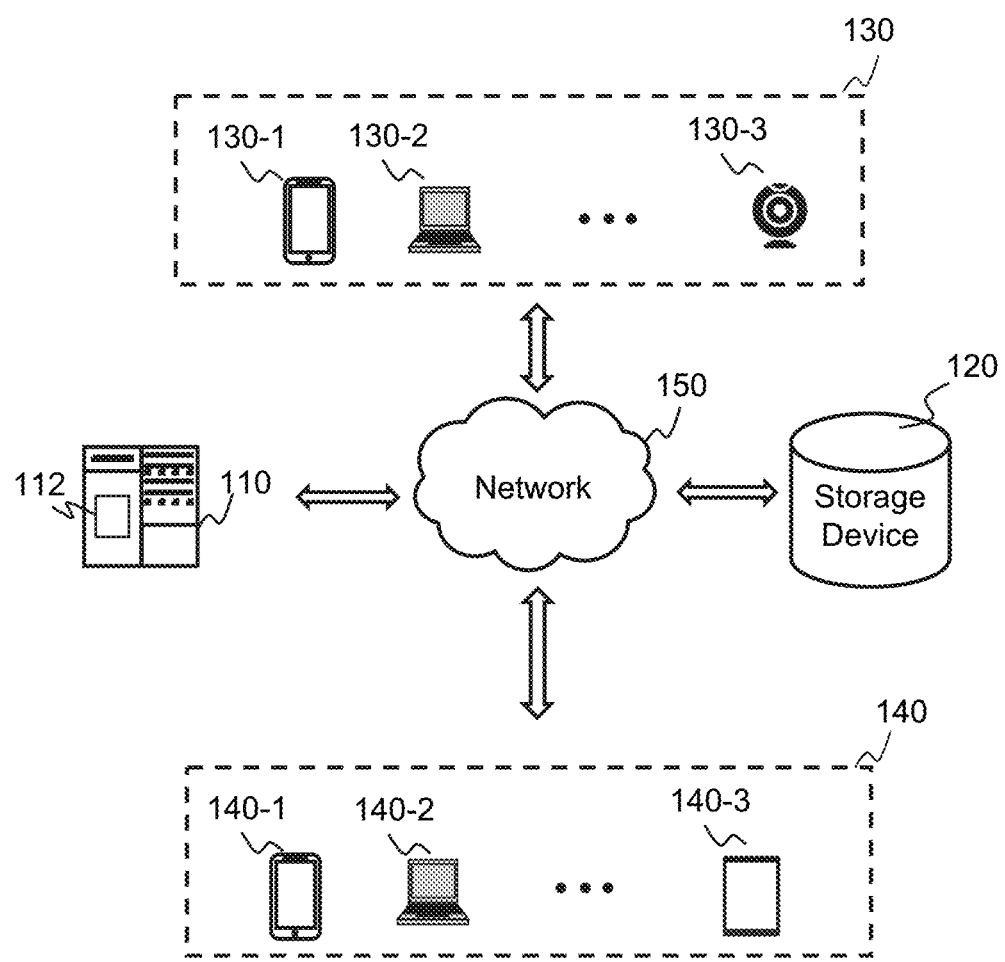
FIG. 1 is a schematic diagram illustrating an image processing system for face recognition according to some embodiments of the present disclosure.

FIG. 1 illustrates a schematic diagram of an image processing system 100 according to some embodiments of the present disclosure. As shown, the image processing system 100 may include a server 110, a storage device 120, an acquisition device 130, a user terminal 140, and a network 150.

The server 110 may process information and/or data relating to the image processing system 100 to perform one or more functions described in the present disclosure. The server 110 may be a single server or a server group. The server group may be centralized, or distributed (e.g., server 110 may be a distributed system). In some embodiments, the server 110 may be local or remote. For example, the server 110 may access information and/or data stored in the acquisition device 130, and/or the storage device 120 via the network 150. As another example, the server 110 may be directly connected to the acquisition device 130, and/or the storage device 120 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 of the present disclosure.

In some embodiments, the server 110 may include one or more processing engines 112 (e.g., single-core processing engine(s) or multi-core processor(s)). For example, the processing engine 112 may obtain an image including one or more objects, such as a human. As another example, the processing engine 112 may determine a target region including a face in the image and extract a plurality of feature points associated with the target region. For each of the plurality of feature points, the processing engine 112 may determine a sub-region including the feature point. As yet another example, the processing engine 112 may perform a first grouping operation on the plurality of feature points to generate a plurality of first groups of sub-regions according to a first rule. As still another example, the processing engine 112 may determine a confidence level associated with the target region based on the plurality of first groups of sub-regions. The confidence level may be used to evaluate an accuracy related to the determination of the target region (also referred to as a first accuracy) and/or an accuracy related to the extraction of the plurality of feature points associated with the target region (also referred to as a second accuracy). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing engine 112 may be configured to adjust the pixel value of each of the target pixels in the target image to sharpen the target image.

The storage device 120 may store data and/or instructions. The data and/or instructions may be obtained from, for example, the server 110, the acquisition device 130, and/or any other component of the image processing system 100.

In some embodiments, the storage device 120 may store data and/or instructions that the server 110 may execute or use to perform methods described in some embodiments of the present disclosure. For example, the storage device 120 may store an image to be processed. As another example, the storage device 120 may store a trained target model for determining the confidence level associated with a target region in an image. In some embodiments, the storage device 120 may include a mass storage, a removable storage, a volatile read-and-write memory, a read-only memory (ROM), or the like, or any combination thereof. For instance, the mass storage may include a magnetic disk, an optical disk, a solid-state drives, etc. The removable storage may include but not limited to a flash drive, a floppy disk, an optical disk, a memory card, a zip disk, a magnetic tape, etc. The volatile read-and-write memory may include but not limited to a random access memory (RAM). The RAM may include but not limited to a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include but not limited to a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 150 to communicate with one or more components of the image processing system 100 (e.g., the server 110, the acquisition device 130). One or more components of the image processing system 100 may access the data or instructions stored in the storage device 120 via the network 150. In some embodiments, the storage device 120 may be directly connected to or communicate with one or more components of the image processing system 100 (e.g., the server 110, the acquisition device 130). In some embodiments, the storage device 120 may be part of another component of the image processing system 100, such as the server 110, the acquisition device 130, or the user terminal 140.

In some embodiments, one or more components of the image processing system 100 (e.g., the server 110, the acquisition device 130) may have a permission to access the storage device 120. For example, the server 110 or the user terminal 140 may obtain an image to be processed stored in the storage device 120.

The acquisition device 130 may be and/or include any suitable device that is capable of acquiring an image. In some embodiments, the acquisition device 130 may include a mobile phone 130-1, a computer 130-2, a surveillance camera 130-3, etc. The computer 130-2 may include but not limit to a laptop, a tablet computer, a desktop, or the like, or any combination thereof. For example, a camera mounted on the mobile phone 130-1 or the computer 130-2 may acquire one or more images. The surveillance camera 130-3 may include but not limit to a gun camera, a dome camera, an integrated camera, a monocular camera, a binocular camera, a multi-view camera, or the like, or any combination thereof. The image acquired by the acquisition device 130 may be a single image or a frame of a video. In some embodiments, the acquisition device 130 may include a plurality of components each of which can acquire an image. For example, the acquisition device 130 may include a plurality of sub-cameras that can take pictures or videos simultaneously.

The user terminal 140 may be associated with a user. For example, the terminal device 140 may include a mobile phone 140-1, a laptop computer 140-2, a tablet computer 140-3, or the like. In some embodiments, the user terminal 140 may be and/or include any suitable device that can display or output information in a human-readable form, such as text, image, audio, video, graph, animation, or the like, or any combination thereof. In some embodiments, the user may view information and/or input data and/or instructions via the user terminal 140. For example, the user may input/modify a parameter via the user terminal 140, such as a first threshold associated with the confidence level associated with the target region. As another example, the user may view the confidence level on a display device of the user terminal 140. The display device of the user terminal 140 may include a cathode ray tube (CRT) display, a liquid crystal display (LCD), a light emitting diode (LED) display, a plasma display panel (PDP), a 3D display, or the like. In some embodiments, the user terminal 140 may be connected to one or more components of the image processing system 100 (e.g., the server 110, the storage device 120, the acquisition device 130) via the network 150, such as a wireless network or a wired network (e.g., a coaxial cable network).

The network 150 may include any suitable network that can facilitate exchange of information and/or data for the image processing system 100. In some embodiments, one or more components in the image processing system 100 (e.g., the server 110, the storage device 120, and the acquisition device 130) may send information and/or data to another component(s) in the image processing system 100 via the network 150. For example, the server 110 may obtain/acquire images from the acquisition device 130 via the network 150. In some embodiments, the network 150 may be any type of wired or wireless network, or combination thereof. Merely by way of example, the network 150 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. For example, the processing engine 112 may be integrated into the user terminal 140. However, those variations and modifications do not depart from the scope of the present disclosure.

FIG. 2 is a schematic diagram illustrating hardware and/or software components of a computing device according to some embodiments of the present disclosure. In some embodiments, the server 110 may be implemented on the computing device 200 shown in FIG. 2. For example, the processing engine 112 may be implemented on the computing device 200 and configured to perform functions of the processing engine 112 disclosed in this disclosure.

The computing device 200 may be used to implement any component of the image processing system 100 as described herein. For example, the processing engine 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

For example, the computing device may further include program storage and data storage of different forms including, for example, a disk 270, and a read-only memory (ROM) 230, or a random-access memory (RAM) 240, for various data files to be processed and/or transmitted by the computing device. For example, computing device may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
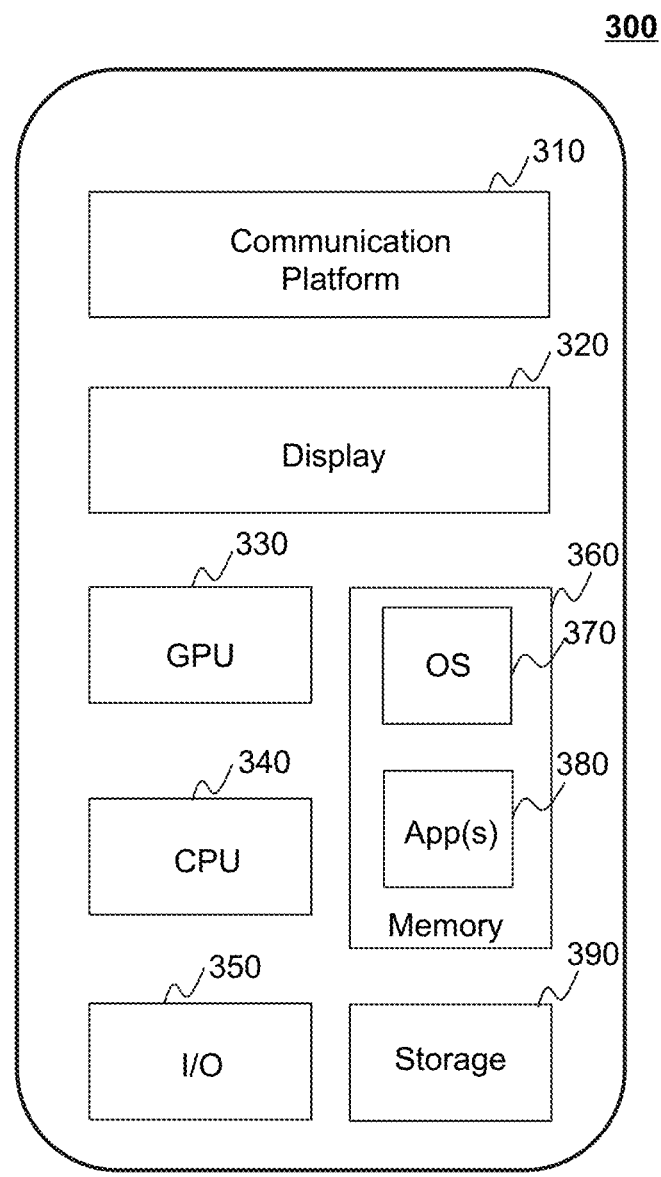
FIG. 3 is a schematic diagram illustrating a terminal device according to some embodiments of the present disclosure.

FIG. 3 is a schematic diagram illustrating a terminal device according to some embodiments of the present disclosure. In some embodiments, the user terminal 140 may be implemented on the terminal device 300 shown in FIG. 3. The terminal device 300 may be a mobile device, such as a mobile phone of a passenger or a driver, a built-in device on a vehicle driven by the driver. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™, etc.) and one or more Apps (applications) 380 may be loaded into the memory 360 from the storage 390 in order to be executed by the CPU 340. User interactions may be achieved via the I/O 350 and provided to the server 110 and/or other components of the image processing system 100 via the network 120. The terminal device 300 may transmit/receive data related to the image to be processed via the communication platform 310. For example, the terminal device 300 may transmit the speech information to the server 110 via the communication platform 310.

Figure 4:
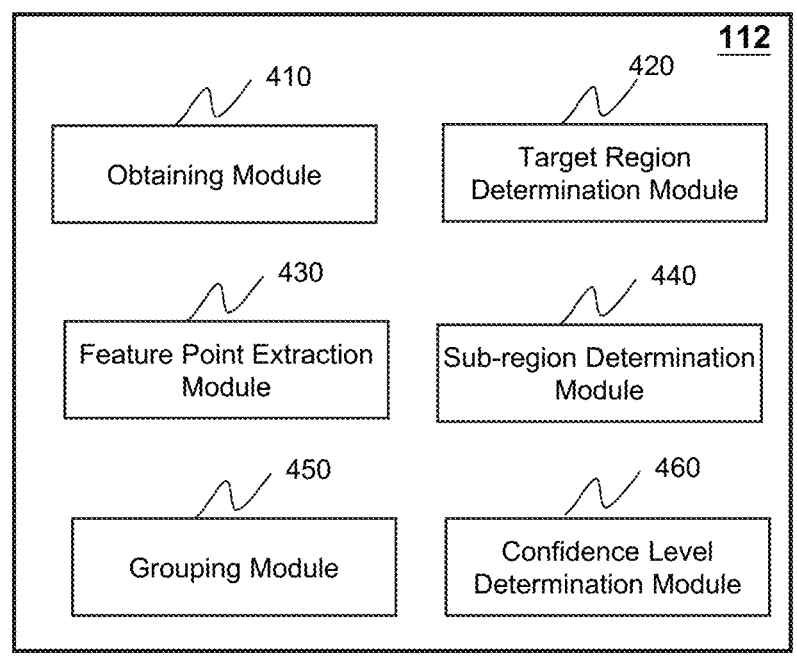
FIG. 4 is a block diagram illustrating a processing engine according to some embodiments of the present disclosure.

FIG. 4 is a block diagram illustrating a processing engine according to some embodiments of the present disclosure. In some embodiments, the processing engine 112 may be implemented on the server 110 and/or the user terminal 140. The processing engine 112 may communicate with a storage medium (e.g., the storage device 120 of the image processing system 100, and/or the storage 390 of the terminal device 300), and may execute instructions stored in the storage medium. In some embodiments, the processing engine 112 may include an obtaining module 410, a target region determination module 420, a feature point extraction module 430, a sub-region determination module 440, a grouping module 450, and a confidence level determination module 460.

The obtaining module 410 may obtain data associated with the imaging processing system 100. In some embodiments, the obtaining module 410 may obtain an image. The image may be acquired by a camera, such as a digital camera, a video camera, a surveillance camera, a web camera, a camera mounted on a smart phone, or the like. The image may include one or more objects, such as a human, an animal, a tree, a building, etc. In some embodiments, the obtaining module 410 may obtain a trained target model. The trained target model may be used to determine a confidence level associated with the target region based on the plurality of first groups of sub-regions.

The target region determination module 420 may determine the target region in the image. The target region may include or be deemed as including a target object, for example, a face. In some embodiments, the image may include one or more faces of one or more humans. The processing engine 112 may determine a target region for each of the one or more faces. Specifically, the processing engine 112 may determine a location and a size of the target region in the image according to a face detection technique. For example, the face detection technique may include a holistic matching technique, a feature-based (structural) technique, a hybrid technique, or the like. The holistic matching technique may include but not limited to an eigenface algorithm, a principal component analysis (PCA), a linear discriminant analysis (LDA), an independent component analysis, etc. The feature-based technique may include but not limited to a feature-template-based technique, a structural matching technique taking geometrical constraints on the features into consideration, a generic technique based on edges, lines, and curves, or the like. In some embodiments, the feature-based technique may include a technique based on a model, such as a support vector machine (SVM) model, a neural network model, an AdaBoost model, or the like, or any combination thereof. The hybrid technique may combine the holistic matching technique and the feature-based technique. In some embodiments, the hybrid technique may be used to determine the target region in a 3D image.

The feature point extraction module 430 may extract a plurality of feature points associated with the target region. In some embodiments, the plurality of feature points may correspond to one or more feature parts (also referred to as key parts) of the target object in the target region. The feature parts may be the parts where a user designates or a machine (e.g., the processing engine 112) can easily identify. For brevity, a feature part may be also referred to as a "key part". For illustration purpose, taking a face as an example of the target object, the key parts of the face in the target region may include but not limited to an eye, a nose, a mouth, etc. In some embodiments, the feature point extraction module 430 may extract the plurality of feature points using a feature point determination technique, such as a template matching technique, a technique based on a neural network model, a technique based on an Active Contour Model (ACM), a technique based on an Active Shape Model (ASM), a technique based on an Active Appearance Model (AAM), or the like, or any combination thereof.

The sub-region determination module 440 may determine a plurality of sub-regions. Each of the plurality of sub-regions may include a feature point. Merely by way of example, for a total number of 68 feature points associated with the target region, the processing engine 112 may determine 668 sub-regions. In some embodiments, the sub-region for each of the plurality of feature points may have a same size, such as 16*16 pixels, 32*32 pixels, 64*64 pixels, etc. In some embodiments, each of the plurality of feature points may be located at a same position in the sub-region, for example, in the center of the sub-region. The processing engine 112 may determine a mapping relationship between each of the plurality of feature points and the corresponding sub-region.

The grouping module 450 may divide the feature points into a plurality of groups to generate a plurality of groups of sub-regions. In some embodiments, the grouping module 450 may perform a first grouping operation on the plurality of feature points to generate a plurality of first groups of sub-regions according to a first rule. In some embodiments, the first rule may include dividing the plurality of feature points into a plurality of first groups. For example, the grouping module 450 may divide the plurality of feature points based on an order (e.g., a sequential order) of the identification numbers of the feature points, a location of the feature points, or the like. The number of the feature points in each group of the plurality of first groups may be the same or different. The first rule may further include generating the plurality of first groups of sub-regions based on the plurality of first groups of feature points and the mapping relationship between each of the plurality of feature points and the corresponding sub-region. In some embodiments, to perform the denoising operation, the grouping module 450 may perform a second grouping operation on the plurality of feature points to generate a plurality of second groups of sub-regions according to a second rule. In some embodiments, the second rule may be the same as the first rule. In some embodiments, the second rule may be different from the first rule. For instance, the second predetermined rule may include dividing the plurality of feature points associated with the target region into a plurality of second groups, where the feature points in each of the plurality of second groups may be selected randomly from the plurality of feature points associated with the target region. The second rule may further include generating the plurality of second groups of sub-regions based on the plurality of second groups of feature points and the mapping relationship between each of the plurality of feature points and the corresponding sub-region. In some embodiments, the denoising operation may be performed on the second groups of sub-regions. In some embodiments, the grouping module 450 may further process the plurality of third groups of denoised sub-regions to generate the plurality of preprocessed sub-regions. For example, the grouping module 450 may mix or concatenate all the denoised sub-regions to form a combined group. The grouping module 450 may perform the first grouping operation on the feature points to generate the plurality of first groups of sub-regions based on the combined group of denoised sub-regions according to the first rule. In some embodiments, the grouping module 450 may redistribute the plurality of third groups of denoised sub-regions according to the first rule to generate the plurality of first groups of sub-regions.

The confidence level determination module 460 may determine the confidence level associated with the target region based on the plurality of first groups of sub-regions. The confidence level, also referred to as a confidence score, may be used to evaluate a first accuracy related to the target region and/or a second accuracy related to the extraction of the feature points associated with the target region. For instance, the confidence level determination module 460 may compare the confidence level with a first threshold (e.g., a predetermined value). The first threshold may be, for example, 0.35, 0.40, 0.45, 0.50, 0.55, etc. In response to a determination that the confidence level is greater than the first threshold, the confidence level determination module 460 may determine that the target region may indeed include the target object (e.g., a face) and/or the extraction of at least some of the plurality of feature points associated with the target region is accurate. In some embodiments, the confidence level determination module 460 may further compare the confidence level with a second threshold. The second threshold may be used to evaluate whether the extraction of the plurality of feature points is accurate. Merely by way of example, the second threshold may be higher than the first threshold associated with the determination result of the target region. For instance, the second threshold may be 0.70, 0.75, 0.80, etc. In response to a determination that the confidence level is greater than the second threshold, the confidence level determination module 460 may determine that the target region indeed includes the target object and that the extraction of the plurality of feature points is accurate. In response to a determination that the confidence level is greater than the first threshold but less than or equal to the second threshold, the confidence level determination module 460 may determine that the target region indeed includes the target object and that the extraction of the plurality of feature points is inaccurate. The confidence level determination module 460 may re-perform operation 506 to extract the feature points associated with the target region. In response to a determination that the confidence level is less than or equal to the first threshold, the confidence level determination module 460 may determine that the determination result of the target region is inaccurate. As such, the target region may not include the target object (e.g., a face) but may include an object that is mistaken for the target object, and/or the feature points associated with the target region may be incorrectly extracted.

The modules in FIG. 4 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, two or more of the modules may be combined into a single module, and any one of the modules may be divided into two or more units.

Figure 5:
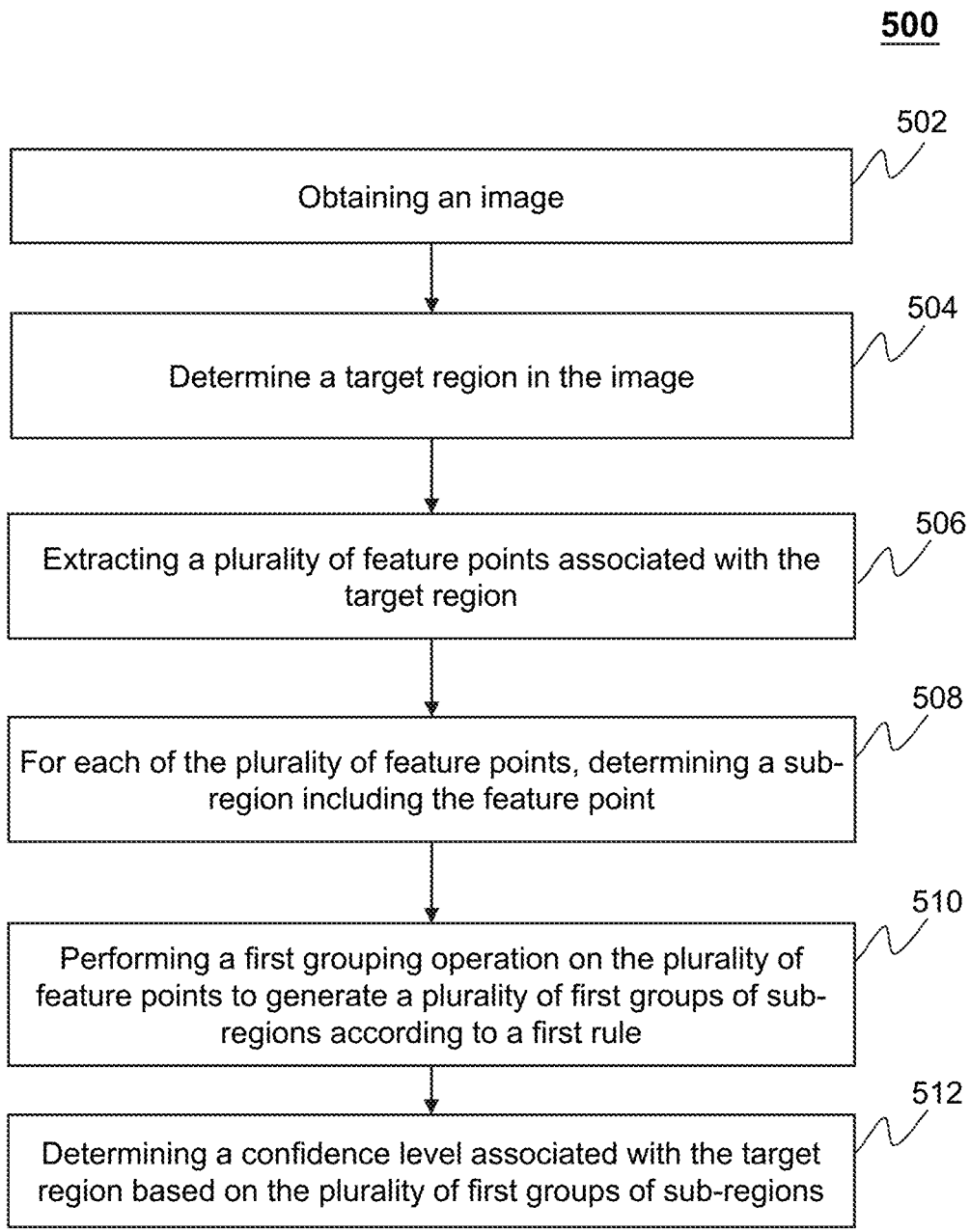
FIG. 5 is a flowchart illustrating a process for image processing according to some embodiments of the present disclosure.

FIG. 5 is a flowchart illustrating a process for image processing according to some embodiments of the present disclosure. In some embodiments, the process 500 may be executed by the image processing system 100. For example, the process 500 may be implemented as a set of instructions (e.g., an application) stored in the storage (e.g., ROM 230 or RAM 240 of the computing device 200). The processing engine 112 and/or modules in FIG. 4 may execute the set of instructions, and when executing the instructions, the processing engine 112 and/or the modules may be configured to perform the process 500. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the processing engine 112 (e.g., the obtaining module 410) may obtain an image. As used herein, the image may be a static image or an image frame of a video. The image may be acquired by a camera, such as a digital camera, a video camera, a surveillance camera, a web camera, a camera mounted on a smart phone, or the like. The image may include one or more objects, such as a human, an animal, a tree, a building, etc. In some embodiments, the image may be a two-dimensional (2D) image, a three-dimensional (3D) image, etc. In some embodiments, the image may be a gray scale image or a color image. For instance, the color image may include a Red Green Blue (RGB) image, a YCbCr (Y, Cb, and Cr represent a luma component, a blue chroma component, and a red chroma component, respectively) image, a Hue-Saturation-Value (HSV) image, etc. In some embodiments, assuming that the image obtained by the processing engine 112 is a color image, the processing engine 112 may convert the color image to a gray scale image before performing operation 504. In some embodiments, the processing engine 112 may adjust the size of the image to a predetermined size. As used herein, the size of the image may be defined by the number of pixels in the image. For example, the predetermined size of the image may be 64*64 pixels, 128*128 pixels, 256*256 pixels, etc. A size of 128*128 pixels may indicate that there are 128 pixels along a horizontal direction in the image and 128 pixels along a vertical direction in the image.

In 504, the processing engine 112 (e.g., the target region determination module 420) may determine a target region in the image. The target region may include or be deemed as including a target object, e.g., a face. In some embodiments, the image may include one or more faces of one or more humans. The processing engine 112 may determine a target region for each of the one or more faces. Specifically, the processing engine 112 may determine a location and a size of the target region in the image according to a face detection technique. For example, the face detection technique may include a holistic matching technique, a feature-based (structural) technique, a hybrid technique, or the like. The holistic matching technique may include but not limited to an eigenface algorithm, a principal component analysis (PCA), a linear discriminant analysis (LDA), an independent component analysis, etc. The feature-based technique may include but not limited to a feature-template-based technique, a structural matching technique taking geometrical constraints on the features into consideration, a generic technique based on edges, lines, and curves, or the like. In some embodiments, the feature-based technique may include a technique based on a model, such as a support vector machine (SVM) model, a neural network model, an AdaBoost model, or the like, or any combination thereof. The hybrid technique may combine the holistic matching technique and the feature-based technique. In some embodiments, the hybrid technique may be used to determine the target region in a 3D image.

In 506, the processing engine 112 (e.g., the feature point extraction module 430) may extract a plurality of feature points associated with the target region. In some embodiments, the plurality of feature points may correspond to one or more feature parts of the target object in the target region. The feature parts may be the parts where a user designates or a machine (e.g., the processing engine 112) can easily identify. For brevity, a feature part may be also referred to as a "key part". For illustration purpose, taking a face as an example of the target object, the key parts of the face in the target region may include but not limited to an eye, a nose, a mouth, etc. The feature points may also be referred to as "facial landmarks". The total number of the plurality of feature points may be 5, 14, 68, 106, etc. In some embodiments, the total number of the plurality of feature points may be set by a user or according to a default setting of the image processing system 100. In some embodiments, each of the feature point may be marked by a label of location (e.g., a coordinate), an identification number, etc. In some embodiments, the processing engine 112 may extract the plurality of feature points using a feature point determination technique, such as a template matching technique, a technique based on a neural network model, a technique based on an Active Contour Model (ACM), a technique based on an Active Shape Model (ASM), a technique based on an Active Appearance Model (AAM), or the like, or any combination thereof.

In 508, for each of the plurality of feature points, the processing engine 112 (e.g., the sub-region determination module 440) may determine a sub-region including the feature point. Merely by way of example, for a total number of 68 feature points associated with the target region, the processing engine 112 may determine 68 sub-regions. In some embodiments, the sub-region for each of the plurality of feature points may have a same size, such as 16*16 pixels, 32*32 pixels, 64*64 pixels, etc. In some embodiments, each of the plurality of feature points may be located at a same position in the sub-region, for example, in the center of the sub-region. The processing engine 112 may determine a mapping relationship between each of the plurality of feature points and the corresponding sub-region. In some embodiments, a normalization operation may be performed on each of the plurality of sub-regions to change the range of pixel intensity values of pixels in the sub-region. The normalization operation may reduce the influence on the pixel intensity values caused by factors such as illumination variations. The normalization operation may include a linear normalization operation or a non-linear normalization operation. Merely by way of example, the processing engine 112 may determine an average value of the pixel intensity values of all the pixels in a sub-region and determine an adjusted value for each pixel in the sub-region, for example, by subtracting the average value from the pixel intensity value of the each pixel. More details regarding the plurality of feature points and the plurality of sub-regions may be found elsewhere in the present disclosure, for example, in FIG. 6 and the descriptions thereof.

In 510, the processing engine 112 (e.g., the grouping module 450) may perform a first grouping operation on the plurality of feature points to generate a plurality of first groups of sub-regions according to a first rule. In some embodiments, the first rule may include dividing the plurality of feature points into a plurality of first groups. For example, the processing engine 112 may divide the plurality of feature points based on an order (e.g., a sequential order) of the identification numbers of the feature points, a location of the feature points, or the like. The number of the feature points in each group of the plurality of first groups may be the same or different. For instance, when the total number of the feature points in the target region is 68, the processing engine 112 may divide the 68 feature points into 17 first groups based on the order (e.g., an ascending order or a descending order) of the identification numbers. Each of the 17 first groups of feature points may include 4 feature points. As another example, the processing engine 112 may divide the 68 feature points into a plurality of first groups based on the various parts of the face, such as a left eyebrow, a right eyebrow, a left eye, a left eye, a nose, an upper lip, a lower lip, a contour of the face, or the like. The first rule may further include generating the plurality of first groups of sub-regions based on the plurality of first groups of feature points and the mapping relationship between each of the plurality of feature points and the corresponding sub-region. In some embodiments, the processing engine 112 may preprocess the plurality of sub-regions to generate a plurality of preprocessed sub-regions and generate the plurality of first groups of sub-regions based on the plurality of preprocessed sub-regions. For instance, the preprocessing of the plurality of sub-regions may include a denoising operation. The denoising operation may include but not limited to a filtering operation, a convolution operation, or the like, or any combination thereof.

In some embodiments, the processing engine 112 may perform the denoising operation on the plurality of sub-regions via a uniform denoising algorithm, e.g., by inputting the plurality of sub-regions into a same filter, or performing a same convolution operation (e.g., using a same convolution network) on the plurality of sub-regions. In some embodiments, to perform the denoising operation, the processing engine 112 may perform a second grouping operation on the plurality of feature points to generate a plurality of second groups of sub-regions according to a second rule. For each group of the plurality of second groups of sub-regions, the processing engine 112 may perform the denoising operation to generate a third group of denoised sub-regions. In some embodiments, the denoising operations on different second groups of sub-regions may be different. For example, the processing engine 112 may use different types of filters (e.g., a median filter, a Gaussian filter, a minimal mean square error filter) or to denoise different second groups of sub-regions. Alternatively or additionally, the processing engine 112 may use different types of convolution networks to denoise different second groups of sub-regions. As another example, the processing engine 112 may use a same type of filter to denoise different second groups of sub-regions. The same type of filter used in different second groups may be configured with different parameter values, leading to different denoising strengths in different second groups with same or different noise intensities. Alternatively, the processing engine 112 may use a same type of convolution network to denoise different second groups of sub-regions. The same type of convolution network used in different second groups may be configured with different parameter values, leading to different denoising strengths in different second groups with same or different noise intensities.

In some embodiments, the processing engine 112 may further process the plurality of third groups of denoised sub-regions to generate the plurality of preprocessed sub-regions. For example, the processing engine 112 may mix or concatenate all the denoised sub-regions to form a combined group. The processing engine 112 may further perform the first grouping operation on the feature points to generate the plurality of first groups of sub-regions based on the combined group of denoised sub-regions according to the first rule. In some embodiments, the processing engine 112 may redistribute the plurality of third groups of denoised sub-regions according to the first rule to generate the plurality of first groups of sub-regions. In some embodiments, the first rule and the second rule may be different or same. More details regarding the denoising operation may be found elsewhere in the present disclosure, for example, in FIG. 10 and the descriptions thereof.

In 512, the processing engine 112 (e.g., the confidence level determination module 460) may determine a confidence level associated with the target region based on the plurality of first groups of sub-regions. The confidence level, also referred to as a confidence score, may be used to evaluate a first accuracy related to the target region or a second accuracy related to the extraction of the feature points associated with the target region. For instance, the processing engine 112 may compare the confidence level with a first threshold (e.g., a predetermined value). The first threshold may be, for example, 0.35, 0.40, 0.45, 0.50, 0.55, etc. In response to a determination that the confidence level is greater than the first threshold, the processing engine 112 may determine that the determination result of the target region is accurate. That the determination result of the target region is accurate may denote that the target region may indeed include the target object (e.g., a face). Additionally or alternatively, that the determination result of the target region is accurate may denote that the extraction of at least some of the plurality of feature points associated with the target region may be accurate.

In some embodiments, in response to the determination that the confidence level is greater than the first threshold, the processing engine 112 may determine that the target region indeed includes the target object. Additionally or alternatively, the processing engine 112 may further compare the confidence level with a second threshold. The second threshold may be used to evaluate whether the extraction of the plurality of feature points is accurate. Merely by way of example, the second threshold may be higher than the first threshold associated with the determination result of the target region. For instance, the second threshold may be 0.70, 0.75, 0.80, etc. In response to a determination that the confidence level is greater than the second threshold, the processing engine 112 may further determine that the extraction of the plurality of feature points is accurate. The processing engine 112 may further perform an expression recognition operation, a face tracking operation, a face animation operation, a 3D face modeling operation, or the like, or a combination thereof, based on the target region and/or the accurate feature points in the target region. In response to a determination that the confidence level is greater than the first threshold but less than or equal to the second threshold, the processing engine 112 may determine that the extraction of the plurality of feature points is inaccurate. The processing engine 112 may re-perform operation 506 to extract the feature points associated with the target region. In response to a determination that the confidence level is less than or equal to the first threshold, the processing engine 112 may determine that the determination result of the target region is inaccurate. As such, the target region may not include the target object (e.g., a face) but may include an object that is mistaken for the target object, and/or the feature points associated with the target region may be incorrectly extracted.

In some embodiments, for each group of the plurality of first groups of sub-regions, the processing engine 112 may determine an accuracy parameter that indicates whether the feature points in the first group of sub-regions are accurate. The processing engine 112 may further determine the confidence level based on the accuracy parameter associated with each group of the plurality of first groups of sub-regions. In some embodiments, the processing engine 112 may determine the confidence level associated with the target region using a plurality of trained models. At least one of the plurality of trained models may be constructed based on a convolutional neural network (CNN), a support vector machine (SVM) model, a linear regression model, a logistic regression model, a random forest model, a gradient boost model, a decision-making tree, or the like, or any combination thereof. In some embodiments, the plurality of trained models may be integrated into a trained target model. The trained target model may be configured to process at least a portion of the plurality of first groups of sub-regions simultaneously. In some embodiments, the trained target model may include a plurality of trained models. Each of the plurality of trained models may be configured to determine the accuracy parameter associated with a first group of sub-regions. In such cases, determining the accuracy parameters associated with the plurality of first groups of sub-regions may require less time than determining the accuracy parameters associated with each of the plurality of sub-regions. Therefore, the efficiency for determining the confidence level may be improved. Additionally or alternatively, assuming that the target region indeed includes the target object but a portion of the feature points (e.g., 30%, 40%) are incorrectly extracted due to the occlusion of one or more parts of the target object, the processing engine 112 may accurately determine that the target region includes the target object as long as the determined confidence value is greater than the first threshold. This may improve the accuracy of the determination of whether the target region includes the target object. Details regarding the determination of the confidence level may be found elsewhere in the present disclosure, for example, in FIG. 8 and the descriptions thereof.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 6:
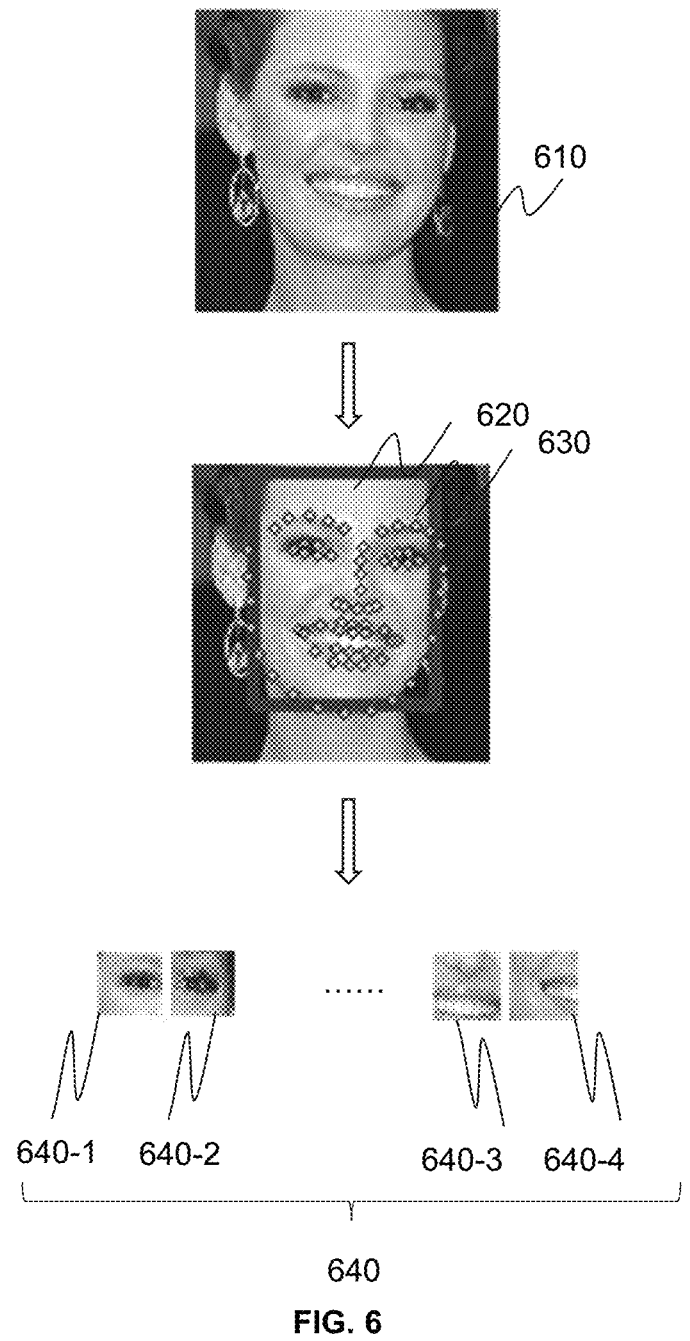
FIG. 6 is a schematic diagram illustrating the determination of feature points and sub-regions including the feature points according to some embodiments of the present disclosure.

FIG. 6 is a schematic diagram illustrating the determination of feature points and sub-regions including the feature points according to some embodiments of the present disclosure. The processing engine 112 may obtain an image 610. The image 610 may be a grayscale image having a size of 128*128 pixels. As shown in FIG. 6, the process engine 112 may determine a target region 620 including a face according to a face detection technique. The target region may be a rectangular region. The processing engine 112 may further determining a plurality of feature points 630 associated with the target region. The plurality of feature points 630 may correspond to various parts of the face in the target region, such as the eyebrows, the eyes, the nose, the mouth, the contour of the face, etc. The processing engine 112 may further determine a plurality of sub-regions 640 having a same size of 16*16 pixels, such as the sub-regions 640-1, 640-2, 640-3, 640-4, etc. Each of the sub-regions 640 may include a feature point 630 located in the center of the sub-region. For instance, the sub-region 640-1 may include a feature point that corresponds to a corner of a right eye.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. In some embodiments, the size of the image 610 may be different from 128*128. For example, the size of the image 610 may be 256*256, 64*64, etc., which is not limited by the present disclosure.

Figure 7:
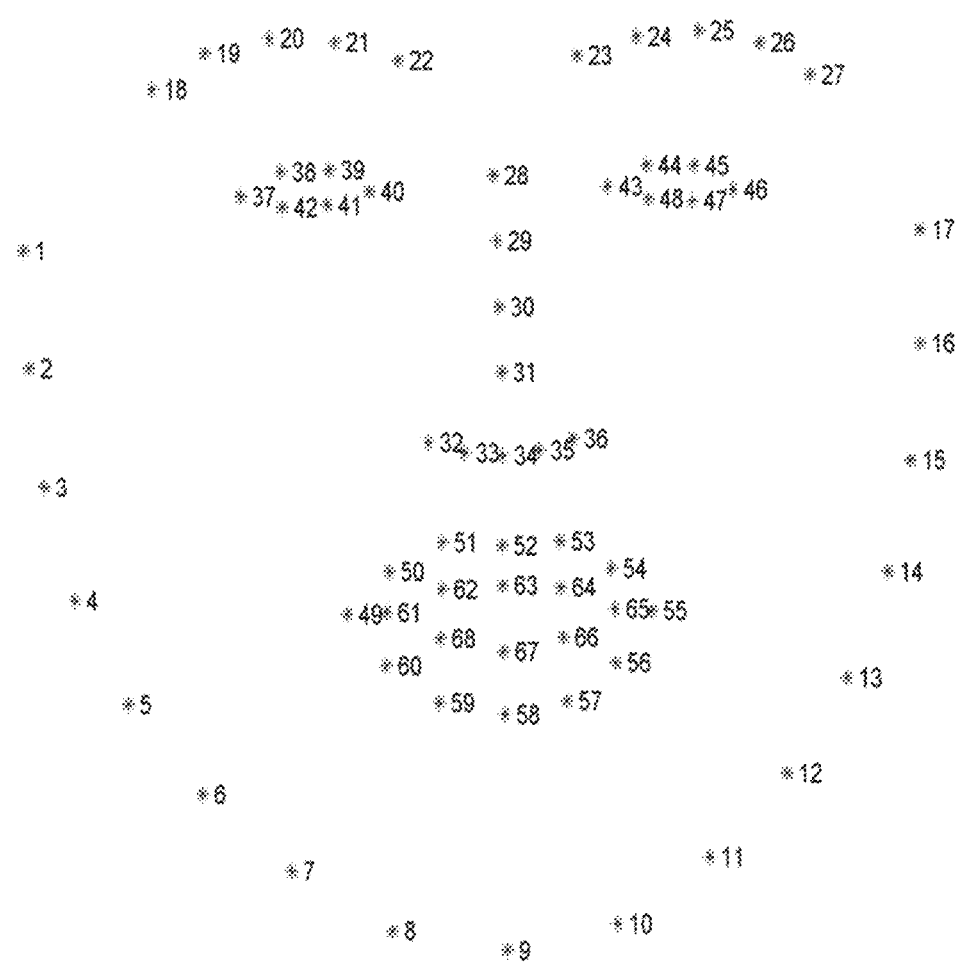

FIG. 7 is a schematic diagram illustrating feature points associated with a target region according to some embodiments of the present disclosure. Merely by way of example, the total number of feature points associated with the target region may be 68. As shown in FIG. 7, each feature point is marked by an identification number. The feature points may correspond to various parts of the face in the target region. For instance, feature points 1-17 may correspond to a contour of the face; feature points 18-22 may correspond to a right eyebrow; feature points 23-27 may correspond to a left eyebrow; feature points 28-36 may correspond to a nose; feature points 37-42 may correspond to a right eye; feature points 43-48 may correspond to a left eye; feature points 49-68 may correspond to a mouth. In some embodiments, the processing engine 112 may determine 17 first groups of feature points according to the first rule. Each group of the first groups of feature points may include 4 feature points determined based on the order of the identification numbers of the feature points. For instance, feature points 1-4 may be included in a first group, feature points 5-8 may be included in another first group. In some embodiments, the processing engine 112 may determine a plurality of first groups of feature points based on the various parts of the face corresponding to the feature points. For example, feature points 37-42 may be included in a first group corresponding to a right eye.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. In some embodiments, the total number of feature points associated with the target region may be different from the total number of feature points shown in FIG. 6. For example, the total number of feature points associated with the target region may be 5, 14, 106, etc.

Figure 8:
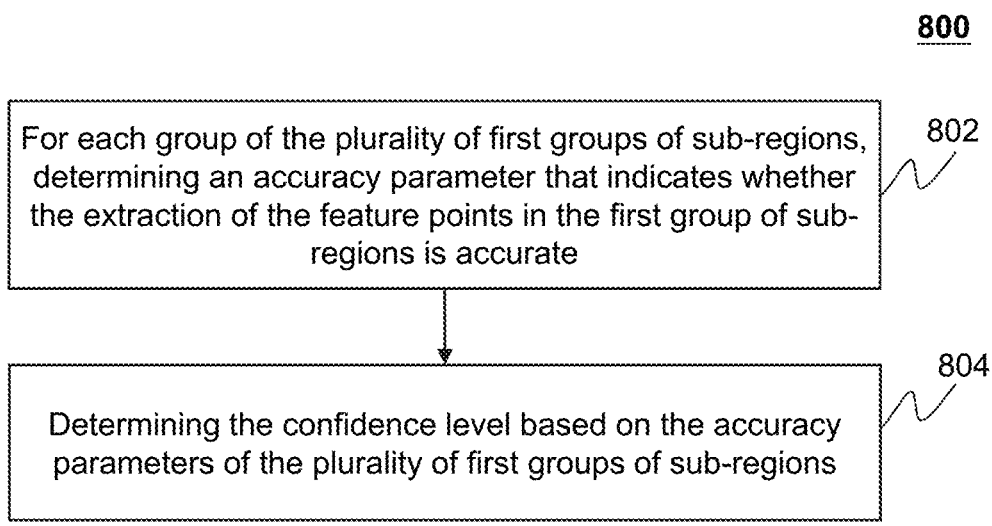
FIG. 8 is a flowchart illustrating a process for determining a confidence level associated with a target region according to some embodiments of the present disclosure.

FIG. 8 is a flowchart illustrating a process for determining a confidence level associated with a target region according to some embodiments of the present disclosure. In some embodiments, the process 800 may be executed by the image processing system 100. For example, the process 800 may be implemented as a set of instructions (e.g., an application) stored in the storage (e.g., ROM 230 or RAM 240 of the computing device 200). The processing engine 112 and/or modules in FIG. 4 may execute the set of instructions, and when executing the instructions, the processing engine 112 and/or the modules may be configured to perform the process 800. The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the operation 512 may be performed according to the process 800. As shown in FIG. 8, the process 800 may include the following operations.

In 802, for each group of the plurality of first groups of sub-regions, the processing engine 112 (e.g., the confidence level determination module 460) may determine an accuracy parameter that indicates whether the extraction of the feature points in the first group of sub-regions is accurate. For example, the accuracy parameter may be a value selected from 0 or 1, where 0 may indicate that the extraction of the feature points in the first group of sub-regions is inaccurate, and 1 may indicate that the extraction of feature points in the first groups of sub-regions is accurate. As another example, the accuracy parameter may be a probability that the feature points in the first group of sub-regions are accurate. The probability may be from 0-1, such as 0.1, 0.2, 0.5, 0.7, 0.8, etc. In some embodiments, the processing engine 112 may determine the accuracy parameters associated with the first groups of sub-regions based on a trained target model. The trained target model may include a plurality of trained models. Each of the plurality of trained models may be used to determine an accuracy parameter associated with a first group of sub-regions. For instance, the first groups of sub-regions may be simultaneously inputted into the plurality of trained models, respectively. The plurality of trained models may output the accuracy parameters associated with the first groups of sub-regions, respectively. In some embodiments, the first grouping operation may be performed using the trained target model. For example, the plurality of sub-regions (or the plurality of preprocessed sub-regions provided that a preprocessing operation is performed) may be inputted into the trained target model. The trained target model may perform the first grouping operation on the plurality of feature points and generate the plurality of first groups of sub-regions according to the first rule. In some embodiments, the plurality of first groups of sub-regions may be directly inputted into the trained target model. Details regarding the training process of the trained target model may be found elsewhere in the present disclosure, for example, in FIG. 11 and the descriptions thereof.

In some embodiments, at least one of the trained models may be constructed based on a convolutional neural network (CNN), a support vector machine (SVM) model, a linear regression model, a logistic regression model, a random forest model, a gradient boost model, a decision-making tree, or the like, or any combination thereof. For instance, the trained model may include multiple layers, for example, an input layer, one or more hidden layers, and an output layer. The one or more hidden layers may include one or more convolutional layers, one or more batch normalization (BN) layers, one or more activation layers, one or more polling layers, a fully connected layer, a Softmax layer, or the like, or any combination thereof. For example, the one or more activation layers may be configured with one or more activation functions, such as a rectified linear unit (ReLU) function, a Sigmoid function, a Tanh function, a Maxout function, etc. In some embodiments, the trained model may be associated with a set of model parameters. The set of model parameters may include, for example, the size of a convolutional kernel, the number of layers, the number of nodes in each layer, a connected weight between two connected nodes, a bias vector relating to a node, etc. In some embodiments, at least a portion of at least two set of model parameters associated with at least two trained models may be different.

In 804, the processing engine 112 (e.g., the confidence level determination module 460) may determine the confidence level based on the accuracy parameters of the plurality of first groups of sub-regions. In some embodiments, the confidence level may be determined by the trained target model, for example, by a concatenation layer in the trained target model. In some embodiments, when the accuracy parameter is a value selected from 0 or 1, the confidence level may be determined based on the total number of accuracy parameters that is 1 (denoted as $N_1$) and the total number of accuracy parameters (denoted as $N_2$). For instance, the confidence level may be determined as $N_1/N_2$. In some embodiments, when the accuracy parameter is a probability that the feature points in the first group of sub-regions are accurate, the confidence level may be determined based on an average value of the plurality of accuracy parameters.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 9:
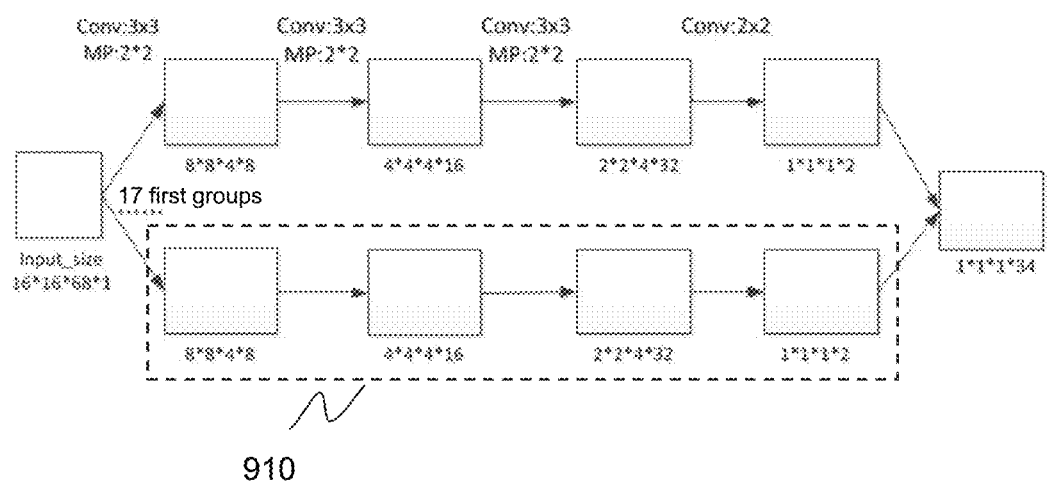
FIG. 9 is a schematic diagram illustrating a trained target model for determining the confidence level according to some embodiments of the present disclosure.

FIG. 9 is a schematic diagram illustrating a trained target model for determining the confidence level according to some embodiments of the present disclosure. Merely by way of example, the total number of the feature points and the total number of the sub-regions corresponding to the feature points may be 68. The plurality of sub-regions (or the plurality of preprocessed sub-regions provided that a preprocessing operation is performed) may be inputted into the trained target model. The input size of the plurality of sub-regions (or the plurality of preprocessed sub-regions) may be 16*16*68*1. The trained target model may perform the first grouping operation to generate 17 first groups of sub-regions. Each of the 17 first groups of sub-regions may have the size of 16*16*4*1 and may be inputted into a trained model 910. Specifically, the trained model 910 may include one or more (e.g., four) convolutional layers. The size of the convolutional kernel for the first convolutional layer, the second convolutional layer, and the third convolutional layer may be 3*3. Each of the first, the second, and the third convolutional layer may be followed by a BN layer, an activation layer configured with a ReLU function, and/or a max pooling (MP) layer (2*2). The output size of the first convolutional layer of the trained model 910 may be 8*8*4*8. The output size of the second convolutional layer may be 4*4*4*16. The output size of the third convolutional layer may be 2*2*4*32. The size of the convolutional kernel of the fourth convolutional layer may be 2*2. The fourth convolutional kernel may be followed by a Softmax layer. Specifically, the Softmax layer may output the accuracy parameter for the first group of sub-regions inputted into the trained model 910. The output size of the Softmax layer may be 1*1*1*2. As shown in FIG. 9, the trained target model may further include a concatenation layer. The concatenation layer may concatenate the output of the Softmax layer of each trained model 910. The output size of the concatenation layer may be 1*1*1*34. The processing engine 112 may further determine the confidence level based on the plurality of accuracy parameters outputted from the plurality of trained models 910, as described elsewhere in the present disclosure, for example, in connection with operation 804 of FIG. 8.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the trained target model may further include one or more convolutional layers for denoising the plurality of second groups of sub-regions, and the one or more convolutional layers may be located before the first convolutional layer of the trained model 910. As another example, the size of the first, the second and/or the third convolutional kernel may be 5*5 instead of 3*3. As yet another example, the size of the input and/or the output of the one or more layers of the trained target model and/or the trained model may be different from the size shown in FIG. 9.

Figure 10:
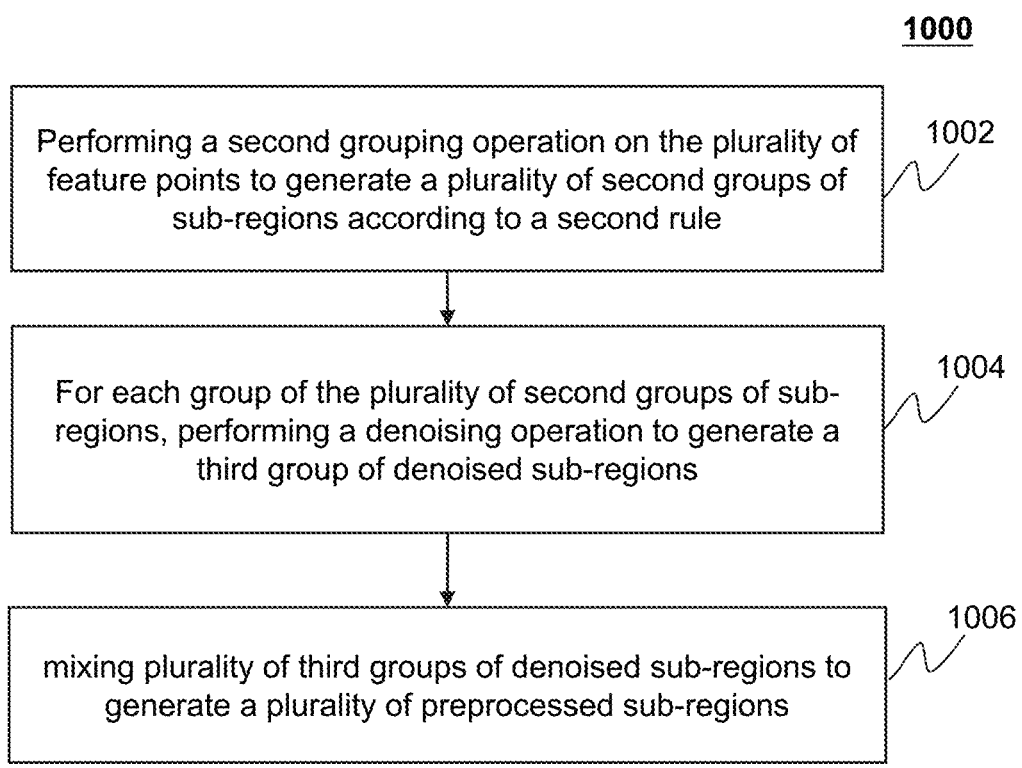
FIG. 10 is a flowchart illustrating a process for generating a plurality of preprocessed sub-regions according to some embodiments of the present disclosure.

FIG. 10 is a flowchart illustrating a process for generating a plurality of preprocessed sub-regions according to some embodiments of the present disclosure. In some embodiments, the process 1000 may be executed by the image processing system 100. For example, the process 1000 may be implemented as a set of instructions (e.g., an application) stored in the storage (e.g., ROM 230 or RAM 240 of the computing device 200). The processing engine 112 and/or modules in FIG. 4 may execute the set of instructions, and when executing the instructions, the processing engine 112 and/or the modules may be configured to perform the process 1000. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting. In some embodiments, the process 1000 may be performed before or included in the operation 508 such that each sub-region including the feature point may be a preprocessed sub-region.

In 1002, the processing engine 112 (e.g., the grouping module 450) may perform a second grouping operation on the plurality of feature points to generate a plurality of second groups of sub-regions according to a second rule. In some embodiments, the second rule may be different from the first rule described in the operation 510. For instance, the second predetermined rule may include dividing the plurality of feature points associated with the target region into a plurality of second groups, where the feature points in each of the plurality of second groups may be selected randomly from the plurality of feature points associated with the target region. The second rule may further include generating the plurality of second groups of sub-regions based on the plurality of second groups of feature points and the mapping relationship between each of the plurality of feature points and the corresponding sub-region.

In 1004, for each group of the plurality of second groups of sub-regions, the processing engine 112 (e.g., the grouping module 450) may perform a denoising operation to generate a third group of denoised sub-regions. In some embodiments, the denoising operation may include one or more filtering operations and/or one or more convolution operations. For example, the processing engine 112 may perform the one or more filtering operations on each second group of sub-regions using a filter, such as a median filter, a mean filter, a minimum filter, a maximum filter, a range filter, a ranking filter, an alpha-trimmed mean filter, a minimal mean square error filter, a Gaussian filter, etc. As another example, the processing engine 112 may perform one or more convolution operations on each second group of sub-regions using one or more convolution networks (e.g., one or more convolutional layers of the trained model in the trained target model described elsewhere in the present disclosure).

In 1006, the processing engine 112 (e.g., the grouping module 450) may mix the plurality of third groups of denoised sub-regions to generate a plurality of preprocessed sub-regions. As used herein, mixing (or concatenating) the plurality of third groups of denoised sub-regions may refer to re-arranging the third groups of denoised sub-regions so that all the denoised sub-regions may exist in a same combined group. The combined group of denoised sub-regions may be referred to as the plurality of preprocessed sub-regions. In some embodiments, the plurality of preprocessed sub-regions may be divided into a plurality of first groups of sub-regions according to the first rule, for example, as described in operation 510 in FIG. 5.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the denoising operation mentioned in operation 1004 may be directly performed on the plurality of first groups of sub-regions before determining the accuracy parameter for each of the plurality of first groups of sub-regions.

Figure 11:
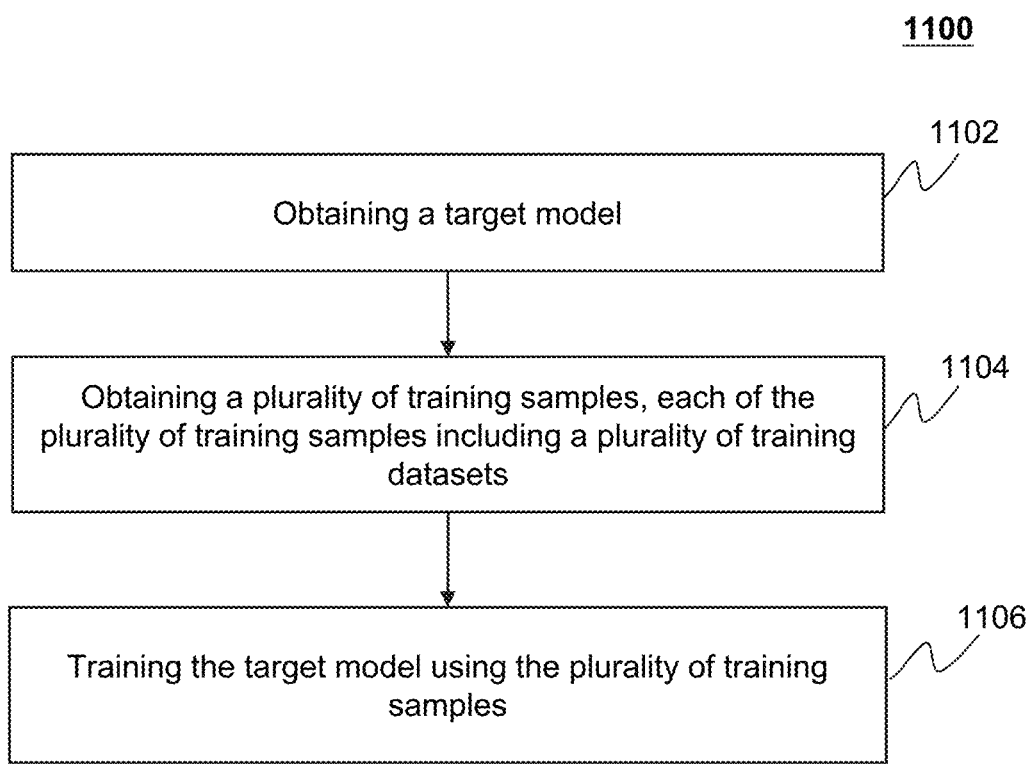
FIG. 11 is a flowchart illustrating a process for training a model for determining the confidence level according to some embodiments of the present disclosure.

FIG. 11 is a flowchart illustrating a process for training a target model for determining the confidence level according to some embodiments of the present disclosure. In some embodiments, the process 1100 may be executed by the image processing system 100. For example, the process 1100 may be implemented as a set of instructions (e.g., an application) stored in the storage (e.g., ROM 230 or RAM 240 of the computing device 200). The processing engine 112 and/or modules in FIG. 4 may execute the set of instructions, and when executing the instructions, the processing engine 112 and/or the modules may be configured to perform the process 1100. The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1102, the processing engine 112 may obtain a target model. In some embodiments, the target model may include the structure described in connection with operation 802 of FIG. 8. For instance, the target model may include a plurality of models that are integrated in the target model. Each of the plurality of models may be constructed based on a convolutional neural network (CNN), a support vector machine (SVM) model, a linear regression model, a logistic regression model, a random forest model, a gradient boost model, a decision-making tree, or the like, or any combination thereof. The processing engine 112 may obtain the target model or each of the plurality of models from a storage device (e.g., the storage device 120).

In 1104, the processing engine 112 may obtain a plurality of training samples, each of the plurality of training samples including a plurality of training datasets. The processing engine 112 may obtain the plurality of training samples from a storage device (e.g., the storage device 120). The operations 1102 and 1104 may be performed simultaneously or sequentially in any order. In some embodiments, each of the plurality of training samples may be associated with a reference target region including a reference target object (e.g., a reference face or a portion thereof). A plurality of feature points, corresponding to key parts of the reference target object, such as a left eye, a nose, a mouth, etc., may be extracted from the reference target region. A plurality of groups of reference sub-regions may be generated according to the first rule described in operation 510. Specifically, each of the plurality of training datasets may include a group of reference sub-regions associated with the reference target region and a label including a reference accuracy parameter. Each of the group of reference sub-regions may include a reference feature point associated with the reference target region. The reference feature point may be located at a same position in each of the reference sub-regions, for example, in the center of each of the reference sub-regions. Merely by way of example, a first training dataset may include a group of reference sub-regions corresponding to a group of reference feature points. The group of reference feature points may be determined based on the identification numbers of the reference feature points, such as four feature points corresponding to a part of the contour of the reference face. As another example, a second training dataset may include another group of reference sub-regions corresponding to another group of reference feature points, such as four feature points corresponding to the right eye of the reference face. In some embodiments, the reference accuracy parameter may indicate whether the reference feature points in the group of reference sub-regions are accurate. In some embodiments, the reference accuracy parameter may be a value selected from 0 or 1, where 0 may indicate that the reference feature points in the group of reference sub-regions are inaccurate, and 1 may indicate that the reference feature points in the group of reference sub-regions are accurate. In some embodiments, the reference accuracy parameter may be a probability that the reference feature points in the group of reference sub-regions are accurate. In some embodiments, the label may be determined and/or examined by a user via a user terminal (e.g., the user terminal 140).

In some embodiments, the plurality of groups of reference sub-regions in a training sample may be generated based on a plurality of reference sub-regions according to the first rule. In some embodiments, the plurality of groups of reference sub-regions may be generated based on a plurality of preprocessed reference sub-regions. For example, a preprocessing operation (e.g., a denoising operation) may be performed on the plurality of reference sub-regions to generate a plurality of preprocessed reference sub-regions. The denoising operation may include one or more filtering operations and/or one or more convolution operations. In some embodiments, a plurality of sets of reference sub-regions may be generated based on the plurality of reference sub-regions according to the second rule. The denoising operation may be performed on the plurality of sets of reference sub-regions simultaneously to generate a plurality of sets of denoised reference sub-regions. The plurality of sets of denoised reference sub-regions may be mixed to generate the plurality of preprocessed reference sub-regions.

In 1106, the processing engine 112 (e.g., the confidence level determination module 460) may train the target model using the plurality of training samples. In some embodiments, the plurality of training datasets in the plurality of training samples may be used to train the plurality of models in the target model, respectively. Each of the plurality of models may be trained using a training algorithm. The training algorithm may include, for example, a gradient descent algorithm, a Newton's algorithm, a Quasi-Newton algorithm, a Levenberg-Marquardt algorithm, a conjugate gradient algorithm, or the like, or a combination thereof. In some embodiments, each of the plurality of models may be trained by performing a plurality of iterations based on a cost function. Before the plurality of iterations, the model parameters of the model may be initialized. For example, the connected weights and/or the bias vector of nodes of the model may be initialized to be random values in a range, e.g., the range from −1 to 1. As another example, all the connected weights of the model may have a same value in the range from −1 to 1, for example, 0. Then the plurality of iterations may be performed to update the parameters of the model until a condition is satisfied. The condition may provide an indication of whether the model is sufficiently trained. For example, the condition may be satisfied if the value of the cost function associated with the model is minimal or smaller than a third threshold (e.g., a pre-set value). As another example, the condition may be satisfied if the value of the cost function converges. The convergence may be deemed to have occurred if the variation of the values of the cost function in two or more consecutive iterations is smaller than a third threshold (e.g., a pre-set value). As still an example, the condition may be satisfied when a specified number of iterations are performed in the training process.

For each of the plurality of iterations, a training dataset in a training sample may be inputted into the model. Specifically, a group of reference sub-regions associated with a reference target region, and a label including a reference accuracy parameter may be processed by one or more layers of the model to generate an estimated accuracy parameter. The estimated accuracy parameter may be compared with the reference accuracy parameter based on the cost function of the model. The cost function of the model may be configured to assess a difference between a testing value (e.g., the estimated accuracy parameter) of the model and a desired value (e.g., the reference accuracy parameter). If the value of the cost function exceeds a third threshold in a current iteration, the model parameters of the model may be adjusted and updated to cause the value of the cost function (i.e., the difference between the estimated accuracy parameter and the reference accuracy parameter) to be smaller than the third threshold. The plurality of iterations may be performed to update the model parameters of the model until a condition is satisfied. In some embodiments, the plurality of models may be trained simultaneously. In some embodiments, the trained target model may be determined based on the updated model parameters of the plurality of models. The trained target model may be transmitted to the storage device (e.g., the storage device 120) for storage. In some embodiments, the trained target model may be used to determine a confidence level associated with a target region including a face, for example, as described in connection with operation 512 of FIG. 5.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system, comprising:
  at least one storage medium including a set of instructions; and
  at least one processor in communication with the at least one storage medium, wherein when executing the set of instructions, the at least one processor is directed to cause the system to:
    obtain an image including a target region;
    extract a plurality of feature points associated with the target region;
    for each of the plurality of feature points,
      determine a sub-region including the feature point;
    perform a first grouping operation on the plurality of feature points to generate a plurality of first groups of sub-regions according to a first rule; and
    determine, based on the plurality of first groups of sub-regions, a confidence level associated with the target region using a plurality of trained models for processing the plurality of first groups of sub-regions, respectively, wherein:
      each of the plurality of trained models is associated with a set of model parameters, and at least two sets of model parameters are different;
    wherein to determine, based on the plurality of first groups of sub-regions, the confidence level associated with the target region using the plurality of trained models, the at least one processor is directed to cause the system to:
      for each group of the plurality of first groups of sub-regions,
        determine an accuracy parameter that indicates whether the extraction of the feature points in the first group of sub-regions is accurate; and
      determine the confidence level based on the accuracy parameters of the plurality of first groups of sub-regions.

2. The system of claim 1, wherein the confidence level is used to evaluate at least one of a first accuracy related to the target region or a second accuracy related to the extraction of the feature points associated with the target region.

3. The system of claim 2, wherein to evaluate the first accuracy related to the target region, the at least one processor is directed to cause the system to:
  compare the confidence level with a first threshold; and
  in response to a determination that the confidence level is greater than the first threshold,
    determine that the target region includes a target object.

4. The system of claim 2, wherein to evaluate the second accuracy related to the extraction of the feature points associated with the target region, the at least one processor is further directed to cause the system to:
  compare the confidence level with a second threshold; and
  in response to a determination that the confidence level is greater than the second threshold,
    determine that the extraction of the feature points is accurate.

5. The system of claim 1, wherein to perform the first grouping operation on the plurality of feature points to generate the plurality of first groups of sub-regions according to the first rule, the at least one processor is directed to cause the system to:
  preprocess the plurality of sub-regions to generate a plurality of preprocessed sub-regions; and
  generate, based on the plurality of preprocessed sub-regions, the plurality of first groups of sub-regions according to the first rule.

6. The system of claim 5, wherein to preprocess the plurality of sub-regions to generate the plurality of preprocessed sub-regions, the at least one processor is directed to cause the system to:
  perform a denoising operation on the plurality of sub-regions.

7. The system of claim 6, wherein to perform the denoising operation on the plurality of sub-regions, the at least one processor is directed to cause the system to:
  perform a second grouping operation on the plurality of feature points to generate a plurality of second groups of sub-regions according to a second rule;
  for each group of the plurality of second groups of sub-regions,
    perform the denoising operation on the second group of sub-regions to generate a third group of denoised sub-regions;
  redistribute the plurality of third groups of denoised sub-regions to generate the plurality of preprocessed sub-regions.

8. The system of claim 7, wherein the denoising operation includes at least one of a convolution operation or a filtering operation.

9. The system of claim 7, wherein the second rule is different from the first rule.

10. The system of claim 1, wherein the plurality of trained models are integrated in a trained target model, and the trained target model is configured to process at least a portion of the plurality of first groups of sub-regions simultaneously.

11. The system of claim 10, wherein the trained target model is obtained by performing a training process on a target model, the training process including:
  obtaining the target model;
  obtaining a plurality of training samples, each of the plurality of training samples including a plurality of training datasets, wherein each of the plurality of training datasets includes a group of reference sub-regions associated with a reference target region and a label including a reference accuracy parameter that indicates whether reference feature points in the group of reference sub-regions are accurate; and
  training the target model using the plurality of training samples.

12. The system of claim 1, wherein at least one of the plurality of trained models is constructed based on at least one of a convolutional neural network (CNN), a support vector machine (SVM) model, a linear regression model, a logistic regression model, a random forest model, a gradient boost model, or a decision-making tree.

13. A method implemented on a computing device including at least one processor and at least one storage medium, the method comprising:
    obtaining an image including a target region;
    extracting a plurality of feature points associated with the target region;
    for each of the plurality of feature points,
        determining a sub-region including the feature point;
    performing a first grouping operation on the plurality of feature points to generate a plurality of first groups of sub-regions according to a first rule; and
    determining, based on the plurality of first groups of sub-regions, a confidence level associated with the target region using a plurality of trained models for processing the plurality of first groups of sub-regions, respectively, wherein:
        each of the plurality of trained models is associated with a set of model parameters, and at least two sets of model parameters are different;
    wherein the determining, based on the plurality of first groups of sub-regions, a confidence level associated with the target region using a trained target model includes:
    for each group of the plurality of first groups of sub-regions,
        determining an accuracy parameter that indicates whether the extraction of the feature points in the first group of sub-regions is accurate; and
    determining the confidence level based on the accuracy parameters of the plurality of first groups of sub-regions.

14. The method of claim 13, wherein the confidence level is used to evaluate at least one of a first accuracy related to the target region or a second accuracy related to the extraction of the feature points associated with the target region.

15. The method of claim 13, wherein the performing a first grouping operation on the plurality of feature points to generate a plurality of first
    groups of sub-regions according to a first rule includes:
    preprocessing the plurality of sub-regions to generate a plurality of preprocessed sub-regions; and
    generating, based on the plurality of preprocessed sub-regions, the plurality of first groups of sub-regions according to the first rule.

16. The method of claim 15, wherein the preprocessing the plurality of sub-regions to generate a plurality of preprocessed sub-regions includes:
    performing a second grouping operation on the plurality of feature points to generate a plurality of second groups of sub-regions according to a second rule;
    for each group of the plurality of second groups of sub-regions,
        performing a denoising operation on the second group of sub-regions to generate a third group of denoised sub-regions; and
    redistributing the plurality of third groups of denoised sub-regions to generate the plurality of preprocessed sub-regions.

17. The method of claim 13, wherein the plurality of trained models are integrated in a trained target model, and the trained target model is configured to process at least a portion of the plurality of first groups of sub-regions simultaneously.

18. A non-transitory computer readable medium, comprising executable instructions that, when executed by at least one processor, directs the at least one processor to perform a method for image processing, the method comprising:
    obtaining an image including a target region;
    extracting a plurality of feature points associated with the target region;
    for each of the plurality of feature points,
        determining a sub-region including the feature point;
    performing a first grouping operation on the plurality of feature points to generate a plurality of first groups of sub-regions according to a first rule; and
        determining, based on the plurality of first groups of sub-regions, a confidence level associated with the target region using a plurality of trained models for processing the plurality of first groups of sub-regions, respectively, wherein:
            each of the plurality of trained models is associated with a set of model parameters, and at least two sets of model parameters are different;
    wherein the determining, based on the plurality of first groups of sub-regions, a confidence level associated with the target region using a trained target model includes:
    for each group of the plurality of first groups of sub-regions,
        determining an accuracy parameter that indicates whether the extraction of the feature points in the first group of sub-regions is accurate; and
    determining the confidence level based on the accuracy parameters of the plurality of first groups of sub-regions.

* * * * *